United States Patent [19]
Trondheim

[11] 3,886,069
[45] May 27, 1975

[54] PROCESS FOR PURIFICATION OF AQUEOUS SODIUM CITRATE SOLUTIONS

[76] Inventor: Olav Erga Trondheim, Eikveien, 7, 7000 Trondheim, Norway

[22] Filed: Nov. 19, 1973

[21] Appl. No.: 416,767

[30] Foreign Application Priority Data
Nov. 24, 1972 Norway................................ 4331/72

[52] U.S. Cl..................................... 210/46; 210/71
[51] Int. Cl............................................. C02b 1/20
[58] Field of Search ............ 210/46, 56, 59, 60, 69, 210/73, 74, 71, 45, 49, 48; 55/73; 260/535 P; 423/243, 242

[56] References Cited
UNITED STATES PATENTS
2,031,802  2/1936  Tyrer ................................. 423/243
2,086,379  7/1937  Clark .................................. 423/243
3,420,881  1/1969  Turco et al. ...................... 260/535 P Primary Examiner—Charles N. Hart
Assistant Examiner—Benoit Castel
Attorney, Agent, or Firm—Wenderoth, Lind & Ponack

[57] ABSTRACT

The invention relates to a process for purification of an aqueous sodium citrate solution which has been used for absorption of sulphur dioxide and then subjected to a stripping operation to remove the majority of the absorbed sulphur dioxide. The solution is evaporated to precipitate sodium citrate, and the remaining solution is cooled to precipitate sodium sulphate.

10 Claims, 1 Drawing Figure

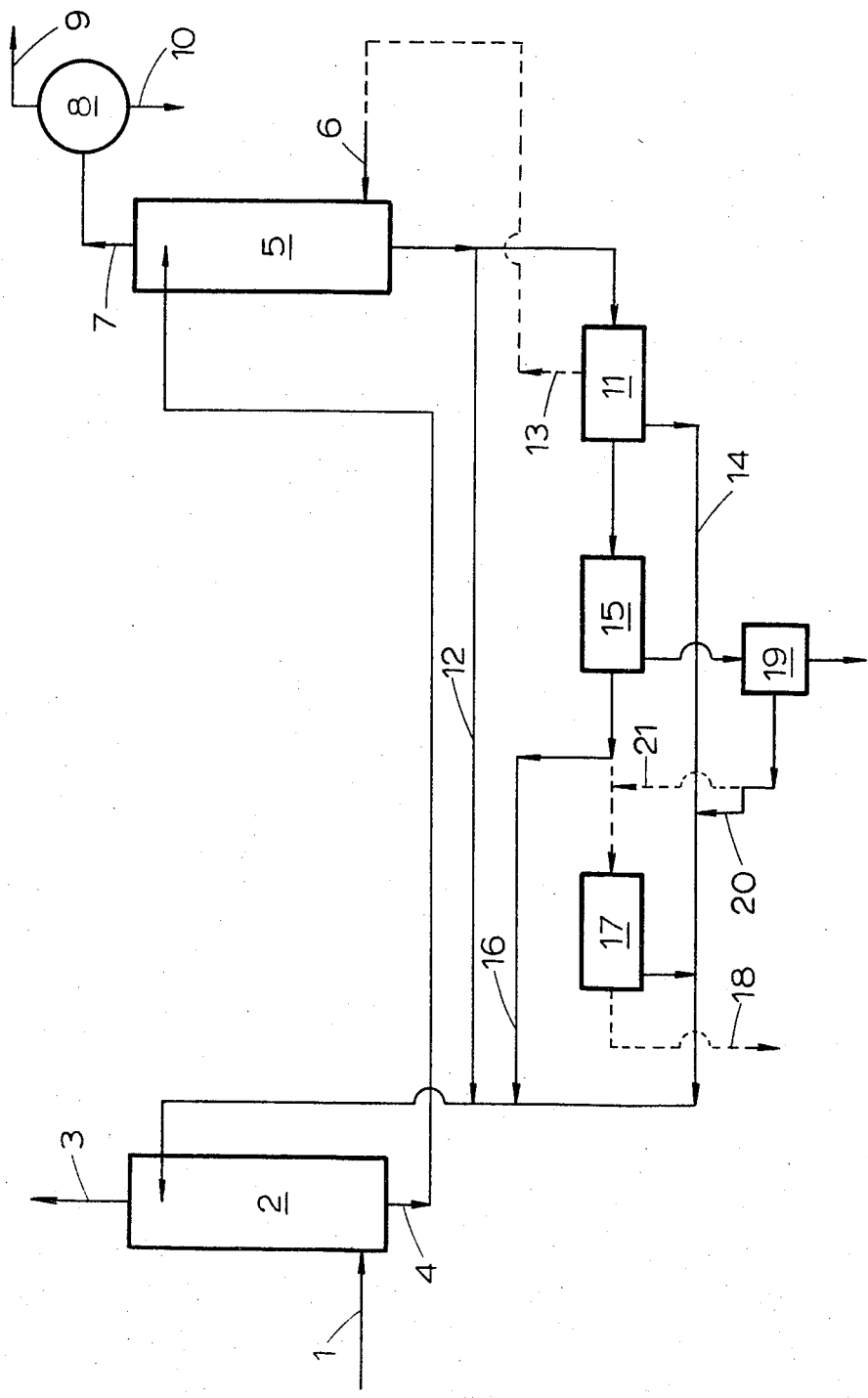

PROCESS FOR PURIFICATION OF AQUEOUS SODIUM CITRATE SOLUTIONS

This invention relates to a process for purification of aqueous sodium citrate solutions which have been used for absorption of sulphur dioxide. It is to be understood that the term "purification" as used herein also comprrises recovery of sodium citrate from the contaminated solutions. It is also to be understood that the term "sodium citrate" comprises tri, di as well as mono sodium citrate. The predominant contamination is sodium sulphate, but other contaminations may also be present. Such solutions are, e.g., obtained when aqueous sodium citrate solutions are used as buffers for absorption and recovery of sulphur dioxide ($SO_2$) from industrial gases, e.g., combustion gases from conventional coal or oil heated thermal power plants, and furnace gases from sulphuric acid factories, Claus plants and Cu smelting works. In such processes the absorption solution is circulated through absorption towers in which the solution takes up $SO_2$ with the formation of bisulphite ions ($HSO_3^-$), the liberated hydrogen ions being simultaneously bound by citrate ions.

1. $SO_2 + 2H_2O \rightleftarrows H_3O^+ + HSO_3^-$
2. $H_3O^+ + H_nCi^{(3-N)-} \rightleftarrows H_{n+1}Ci^{(2-n)-} + H_2O$ ($n=0$, 1 or 2)

(Ci stands for the trivalent citrate ion)

From the absorption tower the solution is conveyed to regenerating plants. The ordinary process will be that sulphur dioxide is expelled by means of steam from the solution which is conveyed back to the absorption tower. In such cases the regeneration takes place in stripping towers and is based on the reversal of the reactions 1 to 2.

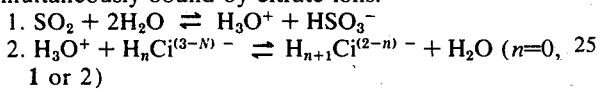

$HSO_3^- + H_3O^+ \rightleftarrows SO_2 \; 30 \; 2H_2O$

An alternative process for the regeneration is to allow absorbed sulphur dioxide to react with hydrogen sulphide to form elementary sulphur.

It has been found that the steam consumption during the stripping process can be reduced by increasing the citrate concentration. But since the sodium citrates have a limited solubility there will be an upper limit for the citrate concentration. This limit depends upon the pH value of the solution, i.e., upon the type of citrate ion, upon dissolved contaminations and upon the temperature. From this and corresponding processes it is known that the specific steam consumption generally increases with decreasing $SO_2$ concentration in the incoming gas.

In addition to $SO_2$ the gases in question will usually contain $SO_3$ and liquid sulphuric acid particles. In addition sulphuric acid may be formed in varying amounts due to oxidation of $SO_2$ in the liquid phase. Because of these circumstances the liquid phase will get a regular addition of sulphuric acid. To counteract that the addition of sulphuric acid reduces the buffer capacity of the absorption solution, there must be added alkali which, e.g., may be soda lye (NaOH) or soda ($Na_2SO_3$). Equivalent amount of alkali will neutralize the sulphuric acid to sodium sulphate. This component will not be removed during the stripping process.

All the known regenerative absorption processes for recovering $SO_2$ from gas streams encounter this problem, and it is known that it is problematic to limit the resulting irreversible accumulation of alkali sulphate in the absorption liquid to an acceptable level of concentration without considerable consumption of auxiliary agents (buffer and/or other chemicals), or complicated process steps.

In connection with the use of citric acid/sodium citrate solutions for regenerative absorption and recovery of $SO_2$ from furnace gases, the following solutions to the sulphate problem have been suggested up to now:

a. A side stream of the absorption liquid is refrigerated with a cooling agent of crystallize Glauber salt, $Na_2SO_4 \cdot 10 H_2O$.
b. Sulphate is precipitated as $BaSO_4$ from a side stream by addition of a soluble barium salt.
c. Sulphate is precipitated as $SrSO_4$ from a side stream by addition of a soluble strontium salt.

Considerable deficiencies may be pointed out for all these methods.

Method (a) will give a useful effectiveness only with relatively hgh sodium sulphate concentrations in the liquid. As an example a buffer of the following composition was tried out:

| | |
|---|---|
| Citric acid ($H_3Ci$) | 1.0 mol per litre |
| NaOH | 1.0 mol per litre |
| $Na_2SO_4$ | 0.25 mol per litre |

Cooling of this from 40°C resulted in beginning crystallization at 4.5°C and 12.7% precipitation of the sodium sulphate in the initial solution after 10 hours with good stirring at 0°C. An increase of the sodium sulphate concentration in the liquid to 0.50 mol per litre in order to improve the precipitation yield, resulted in a beginning crystallization of $Na_2SO_4 \cdot 10H_2O$ at 10°-11°C and 55.5% precipitation at 0°C.

Although the operation temperature for technical $SO_2$ recovery processes will normally be on higher levels, e.g., about 40°C for smelting work gases and 55°C for power plant gases, the liquid should be stable also at lower temperatures, so that it does not cause sodium sulphate crystallization in case of stoppage and subsequent operational problems. This means that the sodium sulphate concentration can normally not be permitted to exceed about 0.50 mol per litre, and under cold climatic conditions, it is advantageously kept below about 0.25 mol per litre.

Direct crystallization of sodium sulphate will therefore require cooling to about 0°C to be effective. This is so close to the freezing point of the solution itself, that a technical accomplishment will be problematic. It will also require a refrigeration plant.

It has been found that the $Na_2SO_4$ solubility is not essentially changed by using more basic buffers than in the above example.

Method (b) is known to suffer from the drawback that it results in consumption of barium salts, since the soluble barium salts cannot be recovered from $BaSO_4$ by simple chemical reactions.

Method (c) involves the risk of precipitating strontium sulphite, $SrSO_3$, in the absorption solution, particularly when the absorption process must be carried out at high pH values where the sulphite ion concentration is significant. This is due to the fact that $SrSO_3$ has a considerably lower solubility than $SrSO_4$.

In addition to the above deficiencies the methods (a) – (c) do not affect other components which during many uses will accumulate in the liquid phase. For instance, for oil heated power plants the following discharge with furnace gas per ton of oil is reported:

80 kg SO$_2$ (4% S in the oil)
1.25 kg SO$_3$
13.5 kg nitrogen oxides (NO$_2$)
0.08 kg aldehydes
1.0 kg particles, containing i.a. metal salts.

To keep the concentration of contaminations on levels which are useful in practice, it will be necessary to draw off liquid regularly from the circulation cycle. The volume drawn off must be replaced with fresh citrate buffer. Estimates show that this buffer consumption can be most vital for the process.

As an example a plant with the following data may be considered:

Amount of SO$_2$ expelled from the stripping tower: 100 k.mol per hour.

Amount of sulphate added to the absorption liquid: 2 k.mol per hour.

Citrate concentration in the absorption liquid: 1 k.mol per m$^3$.

Maximum permitted sulphate concentration in the absorption liquid in view of the risk of precipitation: 0.25 k.mol per m$^3$. The amount of citrate solution which must be replaced with fresh citrate solution to keep the sulphate concentration on a desired level, may on the basis of this be calculated to: 8 m$^3$ per hour. Value of consumed (replaced) amount of citrate calculated as citric acid at a price of about 1 US $ per kilo will then be (192x1.0x8) 1,536 US $ per hour.

The amount of sulphate added represents in the above example 2 mol% of the SO$_2$ production, which is a reasonable value in view of the experience of others in connection with this and similar processes, e.g., absorption in sodium sulphite/bisulphite solutions. Further consideration of the citrate process indicates that the technical possibilities of the process reside in bringing the citrate loss down to preferably about 1% or less of the amount of citrate in the consumed citrate solution, i.e., that at least 99% of the amount of citrate in the solution drawn off are recovered. It has previously not been possible to achieve this in a technically satisfactory manner. It has therefore been necessary to use unsatisfactory processes in which sodium sulphate is the only contamination which can be removed without substantial loss of citrate.

A method which could conceivably solve these problems is to add a soluble calcium salt such as CaCl$_2$ to the liquid drawn off. Citrate and sulphate present would then be precipitated as calcium salts. Addition of sulphuric acids to the precipitate would dissolve the citrate but not the sulphate. Such a process would however involve a considerable consumption of chemicals and also the risk that recirculation of small amounts of calcium ions, which can hardly be avoided, would result in precipitation of heavily soluble calcium sulphite in the absorption liquid.

The present invention offers an unexpectedly simple solution to the problem connected with accumulation of contaminations in aqueous sodium citrate solutions used as buffers in industrial processes for recovery of SO$_2$ from gas streams. As mentioned above it will be desirable under cold climatic conditions to keep the concentration of accumulated sodium sulphate on a low level in such solutions, preferably below 0.25 mol per litre. The invention renders this possible with simple means. It will also offer advantages under conditions where higher sodium sulphate concentrations can be permitted so that precipitation of sodium sulphate by cooling is still possible. Other contamination accumulated in the absorption liquid are also removed by the process without essential loss of buffer and without the use of chemical auxiliary agents. The flow sheet illustrates a method of incorporating the process of the invention in a complete gas scrubbing process.

According to the invention there is provided a process for purification of aqueous sodium citrate solutions which have been used for absorption of sulphur dioxide and then subjected to a stripping operation to remove the majority of the absorbed sulphur dioxide. The process comprises the following steps:

A. The solution is evaporated, sodium citrate seed is added thereto, and it is kept at an elevated temperature to precipitate sodium citrate which is separated off and which in aqueous solution may be used for absorption of sulphur dioxide again.

B. The remaining solution is cooled to 15°C or lower to precipitate sodium sulphate which is separated off, and C. the purified mother liquor, which may be used for absorption of sulphur dioxide again, is optionally subjected to a further evaporation to precipitate more sodium citrate.

The sodium citrate solutions employed for absorption of sulphur dioxide from gases, usually have a concentration of 0.25 to 3.0 mols citrate per litre, preferably 0.5 to 2.0 mols per litre, in particular 1.0 to 1.75 mols per litre. The sulphate content in the solutions when subjected to purification will normally be 0.1 to 1.0 mol per litre, particularly 0.15 to 0.75 mol per litre. When the concentrations of citrate and sulphate are within these ranges, particularly within the more narrow ranges, at least 70%, preferably at least 80% of the water present is evaporated off in the first step, i.e., step (A). It may also be suitable to adjust the evaporation according to the weight of the solution, e.g., be evaporating off 30% or more of the weight of the solution in the first step. The evaporating vessel may, e.g., be placed on a scale, and the evaporation is carried out until the desired weight (weight reduction) has been reached. If the citrate is primarily disodium citrate in concentrations up to 1.5 mols per litre, the solution is suitably evaporated to less than 50% of its initial weight in the first evaporation step. If the citrate is mono sodium citrate the evaporation is preferably carried out until the weight of the solution has been reduced to 40% or less of the initial weight.

It is advantageous and partly necessary to remove crystals during the evaporation, e.g., in an evaporation crystallizer with a centrifuge line connected thereto. Thus, the evaporation may be carried out stepwise with removal of precipitated citrate continuously or several times before the solution is conveyed to the sulphate precipitation step.

The evaporation in step A is suitably carried out at temperatures between 80° and 105°C at approximately atmospheric pressure, but at lower pressures it is possible to use temperatures, e.g., down to 30°C or lower, and at higher pressures up to 150°C or higher.

After sodium citrate seed has been added the solution is kept for some time until equilibrium has been reached. Normally this is necessary for at least half an hour, preferably two hours or more at a slightly elevated temperature in order for the precipitation to become as complete as possible. The temperature at which it is preferred to keep the solution after the evaporation is between 25° and 35°C, particularly between 28° and 32°. Sodium citrate seed is added to achieve an early start of the citrate crystallization, since these solutions exhibit an unexpectedly strong tendency to form supersaturated solutions which do not crystallize within reasonable time. It is also advantageous to stir to accellerate the formation of crystals. During this evaporation treatment normally about 90–95% of the sodium citrate initially present is precipitated without coprecipitation of substancial amounts of sodium sulphate. The citrate precipitate may be easily separated off by filtration or centrifugation.

The solution remaining after the evaporation in step A and the separation of the precipitated sodium citrate has been found to be suitable as starting solution in a sulphate precipitation process. During experiments there has been obtained a precipitate representing 80–95% of the sodium sulphate content of the solution after cooling to 5°–15°C, and the sulphate precipitate consisting of $Na_2SO_4.10H_2O$ has been found to be practically free from coprecipitated sodium citrate. The sulphate precipitation step (step (B)) does not require particularly low temperatures and accordingly not specific cooling means to give sufficient sulphate precipitation.

The solution remaining after precipitation of the sodium sulphate may be used directly for new absorption of sulphur dioxide without further purification. In certain cases, particularly when considerable amounts of other contaminations than sodium sulphate are present, the solution may be subjected to a new evaporation to precipitate more sodium citrate. This evaporation may take place in the same manner as described for step A. It is then possible to precipitate up to 90% or more of the sodium citrate which was not precipitated during the evaporation in the first step (step A). In general the considerations described above for step A also apply to step C. The mother liquor remaining after the recovery of more sodium citrate in step C, contains remaining sodium sulphate and other water soluble components and minor amount of sodium citrate, and it may be discharged or treated further in new process steps to recover valuable materials, or undesired components may be removed or rendered harmless before the solution is discharged. The second evaporation (step C) may also go to dryness, optionally after some more citrate has been precipitated and removed. The citrate may then be dissolved selectively from the evaporation residue by means of adjusted amounts of wter.

The sodium sulphate precipitated in step B is suitably washed with cold water. The resulting washing water may be used for absorption of sulphur dioxide, or it may be subjected to evaporation to recover sodium citrate, optionally together with the solution from the sodium sulphate precipitation. After such a washing of the sulphate precipitate with pure water of 10°C, only traces of coprecipitated sodium citrate will remain in the sodium sulphate.

The attainable recovery of citrate has been found to be dependant on the effectiveness of the sulphate precipitation in step B. Thus, a smaller amount of sulphate in the solution at the beginning of the last citrate precipitation (step C) will result in a higher yield of citrate in a selective precipitation process. In certain cases it may therefore be desirable to precipitate $Na_2SO_4$ at temperatures below about 10°C, e.g. at temperatures of 5°C and lower.

The process according to the invention may be carried out at the same place where the absorption of sulphur dioxide takes place, or the sodium citrate solutions may after the removal of sulphur dioxide by stripping be treated separately for recovery of sodium citrate. When the sodium citrate solutions after having been used for purification of gas primarily contain sodium sulphate as contamination, it is not necessary to subject all the remaining solution after the sulphate precipitation to a further evaporation. This further evaporation may then be carried out with only a small part of said remaining solution, or it may be carried out occasionally when the other contaminations have been accumulated to such an extent that they may give rise to difficulties.

The steam evaporated off during the evaporation in step (A) and possibly in step (C) may be used for heating or for stripping off sulphur dioxide from the sodium citrate solution after the contaminated gas has been passed through the solution. By using the steam in this manner, sodium citrate carried away with the steam will be returned to the system.

With respect to the types of sodium citrate which may be used in the absorption solution, it is suitable to use di sodium citrate for purification of gases having a low content of sulphur dioxide, e.g., from thermal power plants, while for gases which are rich in sulphur dioxide, e.g., from smelting works, it is suitable to use mono sodium citrate.

The invention is illustrated but not limited by the following examples. Examples 1 and 2 illustrate the treatment of solutions corresponding to those which are obtained by absorbing sulphur dioxide-containing gases in sodium citrate solutions and then stripping off the sulphur dioxide. Example 3 illustrates the process of the invention as an integrated part of a complete gas purification process.

EXAMPLE 1. $Na_2HCi$

The starting solution used was 10 litres of an aqueous, solution weighing 12,240 grams and containing 3,541.8 grams (28.93 % by weight) $Na_2HCi$ and 355 grams (2.90 % by weight) $Na_2SO_4$. It was subjected to evaporation in a stirring vessel at 1 atm. abs. pressure. During the evaporation some small disodium citrate crystals were added to initiate the crystallization. After 6,298 grams $H_2O$ had been evaporated off in 4 hours the process was stopped, and the solution with crystals was allowed to stand over night with stirring at 30°C. The crystals were then separated off by centrifugation. The crystal mass was found to contain 2,682 grams $Na_2HCi$ and 15.20 grams $Na_2SO_4$. The mother liquor (29.0 % by weight $Na_2HCi$, 11.4 % by weight $Na_2SO_4$) was subjected to a repeated evaporation in the same apparatus at 1 atm. abs. pressure with addition of seed crystals. In the course of about 1½ hour 711 grams of $H_2O$ were evaporated off. After standing with stirring over night at 30°C the crystals were separated off from the mother liquor by centrifugation as described above. The crystal mass was found to contain 536.83 grams $Na_2HCi$ and 5.34 grams $Na_2SO_4$.

The solution (19.5 % by weight $Na_2HCi$, 20.1 % by weight $Na_2SO_4$) from the above precipitations was then cooled with stirring to 10°C. After standing at 2 hours with stirring at this temperature, the crystals formed were filtered off against vacuum and washed with 100 grams of water of 10°C. The crystal mass contained 11.20 grams $Na_2HCi$ and 681 grams $Na_2SO_4.10\ H_2O$.

Mother liquor (3.41 % by weight $Na_2SO_4$, 33.0 % by weight $Na_2HCi$) and washing water from the sulphate precipitation was then subjected to a further evaporation in a stirring vessel at 1 atm.abs. pressure. During the evaporation seeds of disodium citrate were added. After 518 grams $H_2O$ had been evaporated in 1 hour the process was stopped, and the solution with crystals was allowed to stand over night with stirring at 30°C. The crystals were then separated off by centrifugation. The crystal mass was found to contain 235 grams $Na_2HCi$ and 1.3 grams $Na_2SO_4$. The mother liquor (29.0 % by weight $Na_2HCi$, 11.4 % by weight $Na_2SO_4$) was then subjected to a further evaporation in the same apparatus at 1 atm.abs. pressure with addition of seed crystals. In half an hour 63 grams of $H_2O$ were evaporated off. After standing with stirring at 30°C over night the crystals were separated from the mother liquor by centrifugation as described above. The crystal mass was found to contain 47.5 grams $Na_2HCi$ and 0.5 grams $Na_2SO_4$.

In this example, where each of the steps (A) and (C) were carried out in two stages, 3,502 grams $Na_2HCi$ (98.9 %) were recovered, and 332.7 grams $Na_2SO_4$ (93.8 %) were removed.

EXAMPLE 2. $NaH_2Ci$

The starting solution was 10 litres of an aqueous solution weighing 11,324 grams containng 2,141 grams (18.91 % by weight) $NaH_2Ci$ and 355 grams (2.90 % by weight) $Na_2SO_4$. It was subjected to evaporation in a stirring vessel at 1 atm. abs. pressure. During the evaporation a few small mono sodium citrate crystals were added to initiate the crystallization. After 6,685 grams $H_2O$ had been evaporated off in 4–5 hours the process was stopped, and the solution with crystals was allowed to stand over night with stirring at 30°C. The crystals were then separated off by centrifugation. The crystal mass was found to contain 1,561 grams $NaH_2Ci$ and 9.3 grams $Na_2SO_4$. The mother liquor (20.1 % by weight $NaH_2Ci$, 12.0 % by weight $Na_2SO_4$) was then subjected to a further evaporation in the same apparatus at 1 atm.abs. pressure with addition of seed crystals. In about 1½ hour 1,039.5 grams $H_2O$ were evaporated off. After standing with stirring at 30°C over night the crystals were separated from the mother liquor by centrifugation as described above. The crystal mass was found to contain 442.7 grams $NaH_2Ci$ and 5.6 grams $Na_2SO_4$.

The solution (10.2 % by weight $NaH_2Ci$, 25.3 % by weight $Na_2SO_4$) from the above precipitations was then cooled with stirring to 10°C. After standing for 2 hours with stirring at this temperature the crystals formed were filtered off against vacuum and washed with 100 grams of water of 10°C. The crystal mass contained 7.3 grams $NaH_2Ci$ and 699.2 grams $Na_2SO_4.10\ H_2O$.

The mother liquor (21.08 % by weight $NaH_2Ci$, 5.16 % by weight $Na_2SO_4$) and washing water from the sulphate precipitation was then subjected to a further evaporation in a stirring vessel at 1 atm.abs. pressure for ¾ hour. During the evaporation seeds of mono sodium citrate were added. After 368.5 grams of $H_2O$ had been evaporated off in ¾ hour the process was stopped, and the solution with crystals was allowed to stand over night with stirring at 30°C. The crystals were then separated off by centrifugation. The crystal mass was found to contain 77.5 grams $NaH_2Ci$ and 0.5 grams $Na_2SO_4$. The mother liquor (20.1 % by weight $NaH_2Ci$, 12.0 % by weight $Na_2SO_4$) was then subjected to a repeated evaporation in the same apparatus at 1 atm/abs. pressure with addition of seed crystals. In about half an hour 93 grams of $H_2O$ were evaporated off. After standing with stirring at 30°C over night the crystals were separated from the mother liquor by centrifugation as described above. The crystal mass was found to contain 41.2 grams $NaH_2Ci$ and 0.5 grams $Na_2SO_4$.

In this example, where each of the steps (A) and (C) were carried out in two stages, a total of 2,122 grams $NaH_2Ci$ (99.1 %) were recovered, and 339.2 grams $Na_2SO_4$ (95.5 %) were removed.

EXAMPLE 3

In the following reference is made to the enclosed flow sheet illustrating different ways of incorporating the present process in a complete gas scrubbing process. Contaminated gas in introduced through a conduit 1 into an absorption column 2 containing aqueous sodium citrate solution. Purified gas leaves the column through an outlet in the top 3, while contaminated sodium citrate solution is drawn off in the bottom 4 and conveyed to a stripping column 5. Stripping steam is passed into the stripping column 5 through a conduit 6, and sulphur dioxide and water vapour leave the stripping column at the top 7, and are passed through a cooler 8, from which there is a conduit 9 for sulphur dioxide which is utilized in a suitable manner, and a conduit 10 for condensate. The sodium citrate solution which has been subjected to stripping, is conveyed to an evaporator 11, or some of it may be conveyed through conduit 12 directly back to the absorption column 2 without further purification. In the evaporator 11 preferably at least 80% of the water in the solution are removed, and the vapour formed may be passed through a conduit 13 (and further through conduit 6) back to the stripping column 5 to be used as stripping steam therein. The sodium citrate precipitated in the evaporator 11 is conveyed back to the absorption column 2 through conduit 14, optionally after having been dissolved in water or another aqueous liquid. The remaining liquid after the evaporation and precipitation in the evaporator 11, is conveyed to a cooler 15 in which sodium sulphate is precipitated. The mother liquor remaining after cooling and precipitation of sodium sulphate may be partly or wholly conveyed directly back to the absorption column 2. That part of the mother liquor which is not conveyed directly back, is subjected to a further evaporation in evaporator 17, and the sodium citrate thereby obtained may be conveyed together with the sodium citrate from evaporator 11 in the conduit 14 back to the absorption column. The remaining solution from this second evaporation may be discharged through an outlet 18 or it may be subjected to a further purification to recover valuable substances or to remove harmful components. The sodium sulphate precipitated in the cooler 15 may be washed with cold water in a washer 19, and the washing water may be conveyed through a conduit 20 to the conduit 14 in which it may serve as solvent for the sodium citrate from evaporator 11 and/or from evaporator 17, and will then go back to the absorption column. The washing water from the washer 19 may also be conveyed through a conduit 21 to the second evaporator 17 in which it is mixed with the mother liquor from the cooler 15 and subjected to the same treatment as said mother liquor.

Several modifications of the process described above and on the flow sheet are possible. The proportion of the sodium sulphate solution from the stripping column 5 to be conveyed directly back to the absorption column 2 through the conduit 12, and the proportion to be conveyed to the evaporator 11 will be dependant on the extent of contamination in the solution. Thus, in certain cases it may be suitable to allow 95% of the solution to pass through the conduit 12 and 5% to the evaporator 11. In other cases it may, e.g., be suitable to allow up to 10% or more to be conveyed to the evaporator 11. It is also possible to allow the entire liquid stream go through the conduit 12 back to the absorption column 2 for a certain period, and then for another period to the evaporator 11. This also applies to the proportions to be conveyed through the conduit 16 and to the evaporator 17. In certain cases it may be suitable not to have the evaporator 17 as an integrated part of the total process, since the purification carried out therein may take place at some other place when suitable amounts of mother liquor has been reached. The second evaporation according to step (C) of the process may also take place occasionally in the evaporator 11 which is normally used for the first evaporation, step (A), e.g. after suitable amounts of solution remaining after the sodium sulphate precipitation have been collected.

I claim:

1. A process for purification of an aqueous sodium citrate solution which has been used for absorption of sulphur dioxide and then subjected to a stripping operation to remove the majority of the absorbed sulphur dioxide, comprising the following steps:

A. said solution is evaporated at 80° – 105°C at approximately atmospheric pressure to smaller volume, sodium citrate seed is added thereto, and is kept at 25° – 35°C for at least half an hour to precipitate sodium citrate which is separated off, and B. the solution remaining after the sodium citrate precipitated in step A has been separated off, is cooled to 15°C or lower to precipitate sodium sulphate which is separated off.

2. A process according to claim 1 wherein the purified mother liquor remaining after separating off the sodium sulphate in step (B) is recycled for use in absorption of sulphur dioxide.

3. A process according to claim 1 wherein the purified mother liquor remaining after separation of the sodium sulphate in step (B) is subjected to a further evaporation to precipitate additional sodium citrate.

4. A process according to claim 1, wherein the precipitated sodium sulphate is washed with cold water, and the washing water is used for sulphur dioxide absorption.

5. A process according to claim 1, wherein the precipitated sodium sulphate is washed with cold water, and the washing water is subjected to evaporation to recover sodium citrate.

6. A process according to claim 1, wherein steam is produced in the evaporation of step A and said steam is employed as heating medium for evaporation.

7. A process according to claim 1, wherein at least 80% of the water present in the aqueous sodium citrate solution is evaporated off in step (A).

8. A process according to claim 1, wherein the aqueous sodium citrate solution is maintained at 28° – 32°C after the evaporation in step (A).

9. A process according to claim 1, wherein at least 30% of the weight of the aqueous sodium citrate solution is evaporated off in step (A).

10. A process according to claim 9, wherein the aqueous sodium citrate solution is evaporated to 50% or less of its initial weight.

* * * * *

UNITED STATES PATENT OFFICE
CERTIFICATE OF CORRECTION

Patent No. 3,886,069　　　　　　　　Dated May 27, 1975

Inventor(s)　OLAV ERGA

It is certified that error appears in the above-identified patent and that said Letters Patent are hereby corrected as shown below:

In [76], the name and address of the inventor should read as follows:

Olav Erga, Eikveien, 7
    7000, Trondheim, Norway

Signed and Sealed this seventh Day of October 1975

[SEAL]

*Attest:*

RUTH C. MASON
*Attesting Officer*

C. MARSHALL DANN
*Commissioner of Patents and Trademarks*